Sept. 22, 1953    J. W. MARDEN    2,652,623
MANUFACTURE OF REFRACTORY METAL TUBES
Filed March 10, 1945

INVENTOR
J. W. MARDEN.
BY
ATTORNEY

Patented Sept. 22, 1953

2,652,623

UNITED STATES PATENT OFFICE 2,652,623

MANUFACTURE OF REFRACTORY METAL TUBES

John W. Marden, East Orange, N. J., assignor to Westinghouse Electric Corporation, East Pittsburgh, Pa., a corporation of Pennsylvania Application March 10, 1945, Serial No. 582,042

5 Claims. (Cl. 29—156)

This invention relates to the manufacture of refractory metal tubes and, more particularly, to such composed of metal selected from the group consisting of molybdenum, tungsten, and refractory alloys thereof.

The principal object of my invention, generally considered, is to produce tubes of refractory material which have relatively high circumferential strength, by virtue of being formed of wire closely wound in helical form, with the abutting sides of said wire secured together, as by swaging, brazing or welding.

Another object of my invention is to make tubes of metal, such as molybdenum, tungsten and alloys thereof, in which a wire generally trapezoidal or keystone shape in section is wound around a mandrel, so that the tapered section allows for distortion during winding, whereby the abutting surfaces at the sides of said wire lie close together, so that only a small amount of brazing material is necessary in order to unite said surfaces; or as an alternative, such surfaces may be readily swaged or welded together.

A further object of my invention is to manufacture tubes of metal by winding wire thereof about a mandrel, securing the ends of said wire to the corresponding ends of said mandrel, securing the turns of said wire together as by brazing, soldering, swaging or welding, and removing the mandrel as by drilling or the use of acid.

Other objects and advantages of the invention, relating to the particular features, will become apparent as the description proceeds.

Referring to the scale drawing.

When the process of powder metallurgy is used on slugs or ingots of powdered metal such as molybdenum, tungsten, and alloys made by mixing the powdered metals with one another in alloy proportions, or one or both of said powdered metals with small proportions of other metals in alloy proportions, that is, when such are swaged into rods and finally drawn through dies to make wires, the grains thereof are elongated longitudinally, giving a longitudinal strength to the material greater than the transverse strength. The same is true of tubes of such metals or alloys, that is, if such tubes are made by pressing to shape, sintering, and swaging to elongate, the tensile strength longitudinally is greater than the circumferential strength. I therefore propose to take wire which has the desired tensile strength and wind it closely helically, to produce a tube of the desired character that is, one with relatively great circumferential strength.

Figure 1:
Fig. 1 is a perspective view, with parts in section, of a metal tube embodying my invention.
Figure 2:
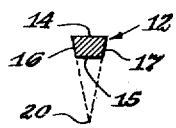
Fig. 2 is an enlarged transverse sectional view of a wire which may be employed to make a tube in accordance with my invention.

Referring to the drawing in detail, like parts being designated by like reference characters, there is shown in Fig. 1 a tube 11 of metal selected from the group consisting of molybdenum, tungsten, and alloys as above identified, having melting points not notably lower than that of molybdenum, and formed by taking a wire 12 desirably shaped as a trapezoid in section as illustrated in Fig. 2. Said wire is closely wound around a mandrel 13, as viewed in Fig. 3. The non-parallel sides of the wire diverge in planes which intersect at 20, corresponding in distance therefrom with the axis of the mandrel 13. In view of the stretching of the outer portions of the wire during the winding operation, the relatively wide side 14 which lies on the outside of the coil is reduced in width to correspond with that of the short side 15 which engages the mandrel, so that the initially diverging sides 16 and 17 extend approximately perpendicular to the axis of the mandrel 13 after the winding operation has been completed. If we assume that the wire wound around the mandrel is formed of molybdenum, tungsten, or high melting point alloys thereof, the mandrel is desirably formed of some readily-machinable cheap metal, such as iron or steel, which is also easily dissolved by acids which do not appreciably attack molybdenum and tungsten.

Figure 3:
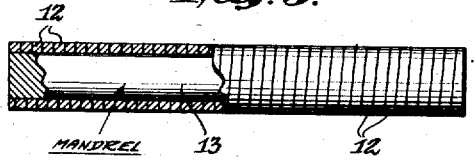
Fig. 3 is an elevational view, with parts in section, of a mandrel wound with wire such as illustrated in Fig. 2.
Figure 4:
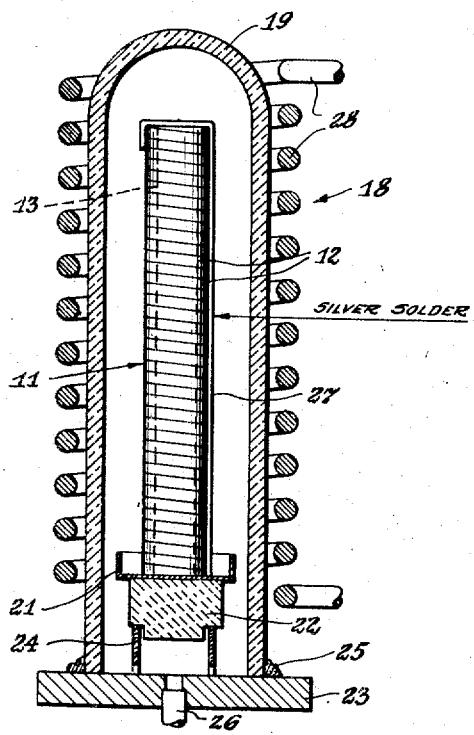
Fig. 4 is a vertical sectional view of an induction furnace containing the wire-wound mandrel of Fig. 3, preparatory to securing the turns of said wire together to form a tube.

After the winding operation has been completed, the ends of the wire 12 are secured to the corresponding ends of the mandrel 13, as by spot welding, and the assembly as shown in Fig. 3 transferred to the induction furnace 18, illustrated in Fig. 4. The furnace desirably comprises a bell jar 19 formed of heat-resisting transparent material, such as "Vycor" which is a 96% silica glass, just large enough to slip over the wound mandrel 13 and a supporting cup 21, desirably formed of molybdenum and resting on a refractory block 22, in turn supported above a base 23 as by means of a refractory hollow cylinder 24. The base 23 may have a cooling coil therein (not shown), and the bell jar 19 is desirably sealed vacuum-tight thereto, as by means of vacuum wax 25. The base 23 is desirably provided with pipe 26 connecting with a vacuum pump (not shown), in order to produce a high vacuum in the bell jar 19.

The solder or brazing compound may be applied to the coils of wire 12 as by means of a strip 27 thereof over and along the length of the wound mandrel, as illustrated. Silver solder is a suitable material. As an alternative, I may employ a eutectic, or approximate "eutectic," formed by mixing powdered molybdenum with one of the metals of series 4, group VIII in powdered form, that is, nickel, iron or cobalt, applied in the form of a paste for brazing the adjacent surfaces of the coil turns together, if the core is formed wholly or mainly of molybdenum. Such approximate "eutectics" have preferred composition ranges as follows: The molybdenum in molybdenum-nickel "eutectic" may vary from 36% to 51%, in molybdenum-iron "eutectic" from 30% to 50%, and in molybdenum-cobalt "eutectic" from 26% to 51%. Similar tungsten eutectics or approximate "eutectics" may be employed if the coil is formed wholly or mainly of tungsten. The manufacture and use of such eutectics for brazing purposes is desirably in accordance with the Malin application, Ser. No. 560,163, filed October 24, 1944, and owned by the assignee of the present application.

The solder or brazing material is desirably applied by the application of suitable high-frequency power to the coil 28, causing the strip 27, or the powdered brazing material or eutectic which may be applied as a paste made with a suitable vehicle such as nitrocellulose in amyl or butyl acetate, to be melted and flow into the narrow spaces between the closely-wound coils of wire 12. The melting is effected after the jar 19 has been evacuated to a high degree, so that there is not only no appreciable oxidation but the heat loss is relatively small. The excess melted brazing material collects in the cup 21, and if all the spaces between the coils are not initially closed, said material will by capillary action seep up along the helical path between the elements of the coil, while kept fluid by the application of high-frequency power thereto. When all of the brazing material has been melted and serves the purpose of securing the coil turns together, the power is disconnected from the high-frequency coil, allowing the material between the turns to cool, before the pool in the cup 21 cools, whereby any space formed by contraction on cooling is replaced by metal from the molten pool.

As an alternative to the soldering or brazing operation in accordance with Fig. 4, the turns may be secured together by passing the wire-wound mandrel through a swaging machine, while heated to the desired swaging temperature, to cause the turns of wire to be welded to form a homeogenous tube about the mandrel, or said turns may be welded together in any other desired manner.

Figure 5:
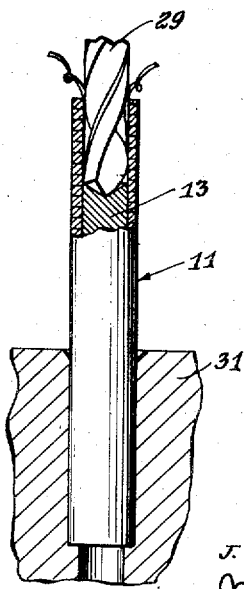
Fig. 5 is an elevational view with parts in axial section showing the wire-wound mandrel of Fig. 4, after the turns of wire have been brazed together, in the process of having the mandrel removed therefrom.

Upon soldering, brazing or welding the turns together, we have a mandrel 13, of steel or the like, about which is a composite tube of refractory metal such as molybdenum, tungsten, or other refractory alloy of similar character. The mandrel may be removed from the refractory tube by means of a drill 29, as illustrated in Fig. 5, while the assembly is held as in a vise 31. As an alternative, however, the mandrel 13 may be removed by chemical means, such as dissolving in an acid which does not affect the material of the tube 11.

From the foregoing disclosure, it will be seen that I have devised an improved method for making tubes of refractory material such as molybdenum, tungsten, and alloys, in which the major portion is molybdenum, tungsten or molybdenum-tungsten, so that the material has qualities adapting it for uses where a refractory tube which has high resistance to abrasion and/or attack by acids is required. One use to which such a tube may be applied is as a liner for a gun barrel, although it will be understood that many other uses may be found.

Although preferred embodiments of my invention have been disclosed, it will be understood that modifications may be made within the spirit and scope of the appended claims.

I claim:

1. The method of making a tube of a metal of the group consisting of molybdenum, tungsten and alloys of one or both of said metals with small proportions of other metals, comprising closely winding a drawn wire of the selected metal, produced by the process of powder metallurgy, helically around a mandrel of readily machinable cheap metal, so that each turn closely abuts its neighbor, securing the ends of said wire to said mandrel, applying brazing material to the coil of wire along the length of the wound mandrel, placing the assembly in an upright position with one end supported in a cup of similar material, enclosing said assembly and cup in an air-tight envelope, evacuating said envelope, heating said assembly in said envelope by high frequency power, thereby causing the brazing material to melt and flow into the narrow space between the turns of wire, so that any excess collects in the supporting cup and if all the space between the turns is not initially filled, said material flows by capillary action up along the helical path between said turns while kept fluid by said high frequency power, discontinuing the application of such power when the desired brazing has been effected, allowing the material to cool, and removing said mandrel from the formed tube, whereby said tube has relatively great circumferential strength, in accordance with the longitudinal strength of the wire from which made.

2. The method of making a tube of a metal of the group consisting of molybdenum, tungsten and alloys of one or both of said metals with small proportions of other metals, comprising closely winding a drawn wire of the selected metal, trapezoidal in section, produced by the process of powder metallurgy, helically around a mandrel of readily machinable cheap metal, so that the wide parallel side of said wire is on the outside, whereby when wound the originally non-parallel sides of said wire are drawn into approximately parallel relationship, so that each turn closely abuts its neighbor, securing the ends of said wire to said mandrel, applying a brazing material to the coil of wire along the length of the wound mandrel, placing the assembly in an upright position with one end supported in a cup of similar material, enclosing said assembly and cup in an air-tight envelope, evacuating said envelope, heating said assembly in said envelope by high frequency power, thereby causing the brazing material to melt and flow into the narrow space between the turns of wire, so that any excess collects in the supporting cup and if all the space between the turns is not initially filled, said material flows by capillary action up along the helical path between said turns while kept fluid by said high frequency power, discontinuing the application of such power when the desired brazing has been effected, allowing the material to cool, and removing said mandrel from the formed tube, whereby said tube has relatively great circumferential strength, in accordance with the longitudinal strength of the wire from which made.

3. The method of making a tube of molybdenum comprising closely winding a drawn molybdenum wire, produced by the process of powder metallurgy, helically around a mandrel of steel, so that each turn closely abuts its neighbor, securing the ends of said wire to said mandrel, applying a eutectic of molybdenum and a metal of Series 4, Group VIII as brazing material to the coil of wire along the length of the wound mandrel, placing the assembly in an upright position with one end supported in a cup of similar material, enclosing said assembly and cup in an air-tight envelope, evacuating said envelope, heating said assembly in said envelope by high frequency power, thereby causing the brazing material to melt and flow into the narrow space between the turns of wire, so that any excess collects in the supporting cup and if all the space between the turns is not initially filled, said material flows by capillary action up along the helical path between said turns while kept fluid by said high frequency power, discontinuing the application of such power when the desired brazing has been effected, allowing the material to cool, and removing said mandrel from the formed tube, whereby said tube has relatively great circumferential strength, in accordance with the longitudinal strength of the wire from which made.

4. The method of making a tube of a metal of the group consisting of molybdenum, tungsten and alloys of one or both of said metals with small proportions of other metals, comprising closely winding a drawn wire of the selected metal, produced by the process of powder metallurgy, helically around a mandrel of readily machinable cheap metal, so that each turn closely abuts its neighbor, securing the ends of said wire to said mandrel, applying silver solder as brazing material to the coil of wire along the length of the wound mandrel, placing the assembly in an upright position with one end supported in a cup of similar material, enclosing said assembly and cup in an air-tight envelope, evacuating said envelope, heating said assembly in said envelope by high frequency power, thereby causing the brazing material to melt and flow into the narrow space between the turns of wire, so that any excess collects in the supporting cup and if all the space between the turns is not initially filled, said material flows by capillary action up along the helical path between said turns while kept fluid by said high frequency power, discontinuing the application of such power when the desired brazing has been effected, allowing the material to cool, and removing said mandrel from the formed tube, whereby said tube has relatively great circumferential strength, in accordance with the longitudinal strength of the wire from which made.

5. The method of making a tube of a metal of the group consisting of molybdenum, tungsten and alloys of one or both of said metals with small proportions of other metals, comprising closely winding a wire of the selected metal, helically around a mandrel of readily machinable cheap metal, so that each turn closely abuts its neighbor, securing the ends of said wire to said mandrel, applying brazing material to the coil of wire along the length of the wound mandrel, placing the assembly in an upright position with one end supported in a cup of similar material, enclosing said assembly and cup in an air-tight envelope, evacuating said envelope, heating said assembly in said envelope, thereby causing the brazing material to melt and flow into the narrow space between the turns of wire, so that any excess collects in the supporting cup and if all the space between the turns is not initially filled, said material flows by capillary action up along the helical path between said turns, discontinuing the heating when the desired brazing has been effected, allowing the material to cool, and removing said mandrel from the formed tube, whereby said tube has relatively great circumferential strength, in accordance with the longitudinal strength of the wire from which made.

JOHN W. MARDEN.

References Cited in the file of this patent

UNITED STATES PATENTS

| Number | Name | Date |
|---|---|---|
| 375,435 | Alden | Dec. 27, 1887 |
| 473,943 | Meneely | May 3, 1892 |
| 666,450 | Wilson | Jan. 22, 1901 |
| 1,082,933 | Coolidge | Dec. 30, 1913 |
| 1,111,698 | Liebmann | Sept. 22, 1914 |
| 2,008,423 | Ritchie | July 16, 1935 |
| 2,166,109 | Karmazin | July 18, 1939 |
| 2,210,353 | Barnes | Aug. 6, 1940 |
| 2,261,412 | Reeve | Nov. 4, 1941 |
| 2,279,831 | Lempert | Apr. 14, 1942 |
| 2,288,094 | Karmazin | June 20, 1942 |
| 2,306,291 | Alons | Dec. 22, 1942 |
| 2,316,349 | McMinn | Apr. 13, 1943 |
| 2,373,405 | Lowit | Apr. 10, 1945 |